(12) United States Patent
Wang

(10) Patent No.: US 12,652,076 B2
(45) Date of Patent: Jun. 9, 2026

(54) DOUBLE TALK DETECTION USING CAPTURE UP-SAMPLING

(71) Applicant: Dolby Laboratories Licensing Corporation, San Francisco, CA (US)

(72) Inventor: Ning Wang, Epping (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 764 days.

(21) Appl. No.: 17/906,415

(22) PCT Filed: Mar. 19, 2021

(86) PCT No.: PCT/US2021/023196
§ 371 (c)(1),
(2) Date: Sep. 15, 2022

(87) PCT Pub. No.: WO2021/194881
PCT Pub. Date: Sep. 30, 2021

(65) Prior Publication Data
US 2023/0115316 A1 Apr. 13, 2023

Related U.S. Application Data

(60) Provisional application No. 63/153,522, filed on Feb. 25, 2021, provisional application No. 62/993,136, filed on Mar. 23, 2020.

(51) Int. Cl.
*H04B 3/23* (2006.01)
*H04M 9/08* (2006.01)

(52) U.S. Cl.
CPC ............ *H04B 3/234* (2013.01); *H04M 9/082* (2013.01)

(58) Field of Classification Search
CPC ............................... H04B 3/234; H04M 9/082
See application file for complete search history.

(56) References Cited

U.S. PATENT DOCUMENTS 5,486,457 A * 1/1996 Butler .................... C12M 41/36
436/526
6,163,608 A * 12/2000 Romesburg ........... H04M 9/082
379/406.01

(Continued)

FOREIGN PATENT DOCUMENTS

| JP | H06204918 A | 7/1994 |
| JP | 2004228939 A | 8/2004 |

(Continued)

OTHER PUBLICATIONS

Gilloire, A. et al "Adaptive Filtering in Subbands with Critical Sampling: Analysis, Experiments, and Application to Acoustic Echo Cancellation" IEEE Transactions on Signal Processing, in IEEE Transactions on Signal Processing, vol. 40, No. 8, pp. 1862-1875, Aug. 1992.

*Primary Examiner* — Lisa Hashem

(57) ABSTRACT

A method of double talk detection includes using up-sampling. Audio signals received from the far end are up-sampled prior to output by the loudspeaker at the near end. The microphone at the near end captures audio at the up-sampled rate, and the audio output by the loudspeaker is detectable due to having no energy in the up-sampled frequency bands. The double talk detector uses this information to generate a signal for suppressing the echo of the far end audio from the captured audio signal that is transmitted to the far end.

20 Claims, 5 Drawing Sheets

(56) References Cited

U.S. PATENT DOCUMENTS

| | | | | |
|---|---|---|---|---|
| 6,496,795 | B1 | 12/2002 | Malvar | |
| 7,046,794 | B2 | 5/2006 | Piket | |
| 7,764,783 | B1 | 7/2010 | Pai | |
| 7,787,613 | B2 * | 8/2010 | Cruz-Zeno | H04M 9/082 |
| | | | | 379/406.04 |
| 8,588,404 | B2 * | 11/2013 | Czyzewski et al. | H04B 3/234 |
| | | | | 379/406.14 |
| 8,625,775 | B2 | 1/2014 | Bhaskar | |
| 8,712,076 | B2 * | 4/2014 | Dickins | G10K 11/16 |
| | | | | 704/226 |
| 8,804,977 | B2 * | 8/2014 | Neal | H04M 9/082 |
| | | | | 704/226 |
| 8,811,601 | B2 | 8/2014 | Mohammad | |
| 8,971,523 | B2 | 3/2015 | Jin | |
| 9,237,226 | B2 * | 1/2016 | Frauenthal | H04M 3/002 |
| 9,277,059 | B2 | 3/2016 | Ahgren | |
| 9,509,852 | B2 | 11/2016 | Thapa | |
| 9,538,299 | B2 | 1/2017 | Alcorn | |
| 9,589,556 | B2 | 3/2017 | Gao | |
| 9,654,609 | B2 * | 5/2017 | Visser | H04M 1/20 |
| 10,121,490 | B2 * | 11/2018 | Dehghani | H04M 9/082 |
| 10,498,389 | B2 * | 12/2019 | Awano | H04B 3/234 |
| 11,399,100 | B2 * | 7/2022 | Sun | H04M 9/082 |
| 11,875,772 | B2 * | 1/2024 | Hsu | G10K 11/1783 |
| 12,231,603 | B2 * | 2/2025 | Wang | H04M 9/082 |
| 2003/0133565 | A1 * | 7/2003 | Chang | H04M 3/493 |
| | | | | 379/406.01 |
| 2010/0266118 | A1 | 10/2010 | Thi | |
| 2011/0033059 | A1 | 2/2011 | Bhaskar | |
| 2014/0146963 | A1 * | 5/2014 | Ikram | H04B 3/234 |
| | | | | 379/406.08 |
| 2014/0205105 | A1 | 7/2014 | Cleve | |
| 2023/0115316 | A1 * | 4/2023 | Wang | H04B 3/234 |
| | | | | 379/406.01 |

FOREIGN PATENT DOCUMENTS

| | | | |
|---|---|---|---|
| JP | 2019004387 | A | 1/2019 |
| KR | 20100057019 | A | 5/2010 |
| KR | 20100097085 | A | 9/2010 |
| RU | 2495506 | C2 | 10/2013 |
| RU | 2664717 | C2 | 8/2018 |
| WO | 2007062287 | A2 | 5/2007 |

* cited by examiner

FIG. 6

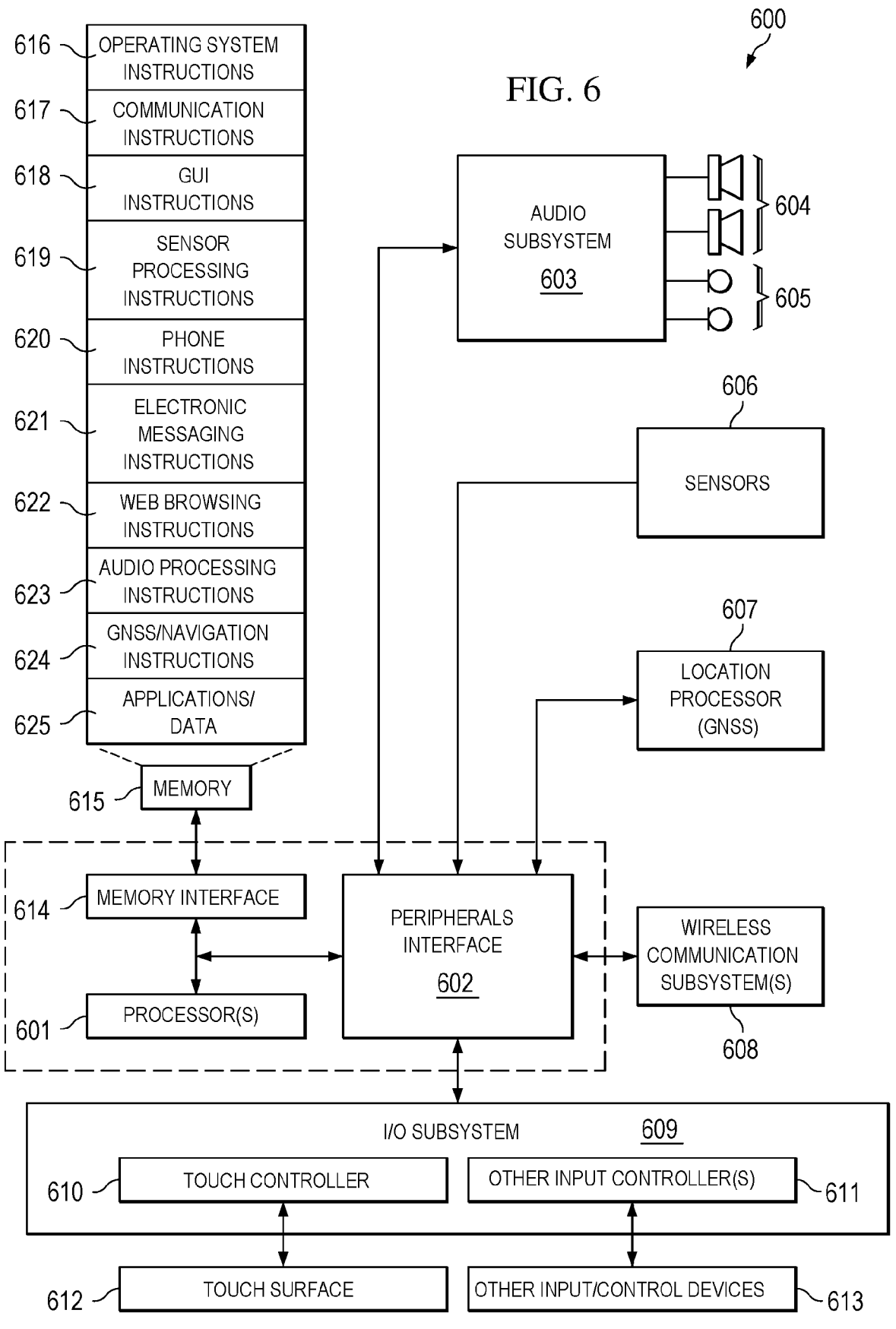

616 — OPERATING SYSTEM INSTRUCTIONS

617 — COMMUNICATION INSTRUCTIONS

618 — GUI INSTRUCTIONS

619 — SENSOR PROCESSING INSTRUCTIONS

620 — PHONE INSTRUCTIONS

621 — ELECTRONIC MESSAGING INSTRUCTIONS

622 — WEB BROWSING INSTRUCTIONS

623 — AUDIO PROCESSING INSTRUCTIONS

624 — GNSS/NAVIGATION INSTRUCTIONS

625 — APPLICATIONS/ DATA

615 — MEMORY

614 — MEMORY INTERFACE

601 — PROCESSOR(S)

602 — PERIPHERALS INTERFACE

603 — AUDIO SUBSYSTEM

604

605

606 — SENSORS

607 — LOCATION PROCESSOR (GNSS)

608 — WIRELESS COMMUNICATION SUBSYSTEM(S)

609 — I/O SUBSYSTEM

610 — TOUCH CONTROLLER

611 — OTHER INPUT CONTROLLER(S)

612 — TOUCH SURFACE

613 — OTHER INPUT/CONTROL DEVICES

600

700

702 — RECEIVE FIRST AUDIO SIGNAL

704 — UP-SAMPLE TO GENERATE SECOND AUDIO SIGNAL

706 — OUTPUT SECOND AUDIO SIGNAL

708 — CAPTURE THIRD AUDIO SIGNAL

710 — DETERMINE SIGNAL POWER OF THIRD AUDIO SIGNAL

712 — DETECT DOUBLE TALK

714 — SELECTIVELY GENERATE CONTROL SIGNAL

716 — PERFORM ECHO MANAGEMENT ON THIRD AUDIO SIGNAL ACCORDING TO CONTROL SIGNAL

DOUBLE TALK DETECTION USING CAPTURE UP-SAMPLING

CROSS REFERENCE TO RELATED APPLICATIONS

The present application claims priority to U.S. Provisional Application No. 63/153,522 filed Feb. 25, 2021, and U.S. Provisional Application No. 62/993,136 filed Mar. 23, 2020, both of which are incorporated herein by reference.

FIELD

The present disclosure relates to audio processing, and in particular, to double talk detection.

BACKGROUND

Unless otherwise indicated herein, the approaches described in this section are not prior art to the claims in this application and are not admitted to be prior art by inclusion in this section.

A telecommunications device such as an audio conferencing system generally includes both a loudspeaker and a microphone. The two parties in a communication may be referred to as the near end party and the far end party. The near end party is proximal to a first telecommunications device, and the far end party is at a different location than the near end party and communicates using a second telecommunications device via a wired or wireless telecommunications network. The microphone of the near end device captures not only the speech of the near end party, but may also capture the speech of the far end party that has been output from the loudspeaker at the near end. The output from the loudspeaker that is captured by the microphone is generally referred to as echo. The near end telecommunications device generally includes an echo management system for reducing the echo prior to transmitting the audio captured at the near end to the far end.

The term double talk is generally used to describe the situation when both parties in a conversation are talking at the same time. Both parties consider double talk to be annoying, and generally one will stop talking. It would be advantageous to have a device that can respond appropriately when double talk occurs in order to improve the quality of the communication, thereby enhancing the user experience

SUMMARY

When double talk exists, it is desirable to transmit the near end speech to the far end without performing much (or any) echo reduction, in order to provide the audible clue to the far end that double talk is occurring. The telecommunications device at the near end may include a double talk detector to detect double talk, and in turn to control the echo management system not to perform too much attenuation.

One issue with existing double talk detection systems is that the non-stationary nature of voice signals results in a high false positive rate of detecting double talk. Furthermore, for telecommunications devices such as laptop computers where the loudspeaker is in close proximity to the microphone, the echo management system needs to perform more attenuation as a default, so false positive detection of double talk becomes even more undesirable in a conversation. Given the above, there is a need to improve double talk detection, especially for devices where the loudspeaker is in close proximity to the microphone.

According to an embodiment, a computer-implemented method of audio processing includes receiving a first audio signal, wherein the first audio signal has a first sampling frequency. The method further includes up-sampling the first audio signal to generate a second audio signal, wherein the second audio signal has a second sampling frequency that is greater than the first sampling frequency. The method further includes outputting, by a loudspeaker, a loudspeaker output corresponding to the second audio signal. The method further includes capturing, by a microphone, a third audio signal, wherein the third audio signal has a third sampling frequency that is greater than the first sampling frequency. The method further includes determining a signal power of the third audio signal. The method further includes detecting double talk when there is signal power of the third audio signal determined in a frequency band greater than the first sampling frequency.

The method may further include selectively generating a control signal when the double talk is detected, and performing echo management on the third audio signal according to the control signal.

Determining the signal power of the third audio signal and detecting the double talk may include measuring the signal power of the third audio signal in the frequency band greater than the first sampling frequency; tracking a background noise power of the third audio signal in the frequency band greater than the first sampling frequency; and detecting the double talk as a result of comparing the signal power of the third audio signal in the frequency band greater than the first sampling frequency and the background noise power of the third audio signal in the frequency band greater than the first sampling frequency.

According to another embodiment, an apparatus includes a loudspeaker, a microphone and a processor. The processor is configured to control the apparatus to implement one or more of the methods described herein. The apparatus may additionally include similar details to those of one or more of the methods described herein.

According to another embodiment, a non-transitory computer readable medium stores a computer program that, when executed by a processor, controls an apparatus to execute processing including one or more of the methods described herein.

The following detailed description and accompanying drawings provide a further understanding of the nature and advantages of various implementations.

BRIEF DESCRIPTION OF THE DRAWINGS

FIG. 6 is a mobile device architecture 600 for implementing the features and processes described herein, according to an embodiment.

DETAILED DESCRIPTION

Described herein are techniques related to double talk detection. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

This document describes various processing functions that are associated with structures such as blocks, elements, components, circuits, etc. In general, these structures may be implemented by a processor that is controlled by one or more computer programs.

Figure 1:
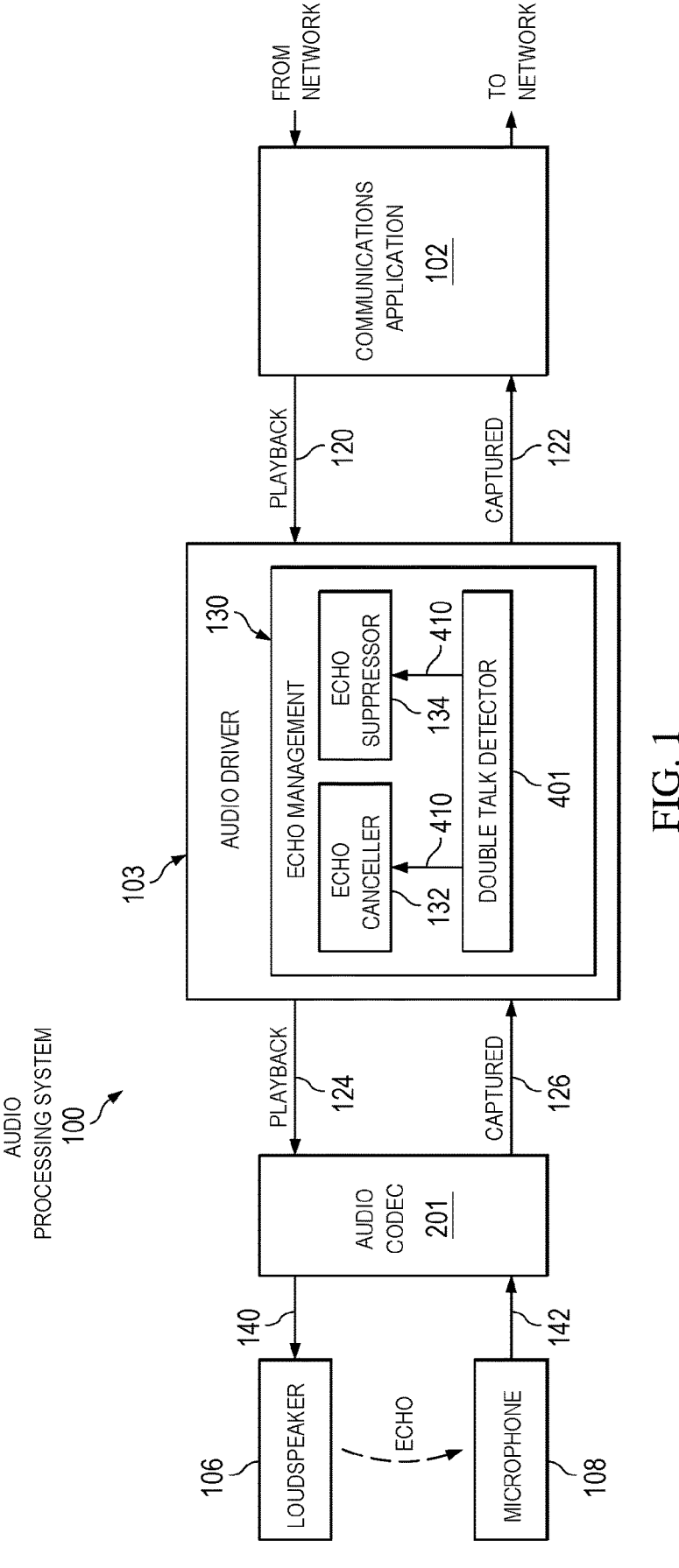
FIG. 1 is a block diagram of an audio processing system 100.

FIG. 1 is a block diagram of an audio processing system 100. The audio processing system 100 may be implemented in various devices, such as laptop computers, mobile telephones, speakerphones, audioconferencing systems, videoconferencing systems, etc. For example, the audio processing system 100 may be implemented in a laptop computer, with various components implemented by computer programs that the laptop computer executes. The audio processing system 100 includes a communication application 102, an audio driver system 103, an audio codec system 201, a loudspeaker 106, and a microphone 108. The audio processing system 100 may include other components that (for brevity) are not discussed in detail.

The communication application 102 generally controls the audio inputs and outputs of the device that implements the audio processing system 100. For example, when the implementing device is a laptop computer, the communications application 102 may be a computer program such as a Microsoft Skype™ application, a Microsoft Teams™ application, a Zoom™ application, etc. The communication application 102 communicates with a network (not shown), to receive audio from remote devices (also referred to as far end devices) for output by the audio processing system 100 (also referred to as the near end device), and to transmit audio captured by the audio processing system 100 to the remote devices. The audio received from the network for near end output is referred to as the playback audio signal 120, and the audio transmitted to the network for far end output is referred to as the captured audio signal 122.

The audio driver system 103 generally performs audio processing on the signals it receives and generates processed audio signals. The audio driver system 103 receives the playback audio signal 120 and generates a playback audio signal 124; and receives a captured audio signal 126 and generates the captured audio signal 122. The communications application 102 may offload various audio processing processes to the audio driver system 103, and the audio driver system 103 may be a component of the communications application 102. The audio driver system 103 may be referred to as a playback/capture stack, an audio processing object (APO), etc. An example of the audio driver system 103 is the Dolby Voice™ communications system. The audio driver system 103 provides the playback audio signal 124 to the audio codec system 201 and receives the captured audio signal 126 from the audio codec system 201.

The audio driver system 103 includes various processing modules, including an echo management system 130. The echo management system 130 generally attenuates the echo of the far end voice output from the loudspeaker 106 and captured by the microphone 108, while preserving the near end voice captured by the microphone 108. The echo management system 130 includes an echo canceller 132, an echo suppressor 134, and a double talk detector 401.

The echo canceller 132 generally performs echo cancellation on the captured audio signal 126. Echo cancellation may also be referred to as acoustic echo cancellation. In general, echo cancellation applies a linear attenuation to the signal. The echo canceller may be implemented with an adaptive filter. The adaptive filter models the room response of the combined system of the loudspeaker 106 and the microphone 108. The echo canceller 132 typically may apply up to between 20 and 25 dB of attenuation to the captured audio signal 126.

The echo suppressor 134 generally performs echo suppression on the captured audio signal 126. In general, echo suppression applies a non-linear attenuation to the signal. The non-linear attenuation may be performed on the basis of power bands, and the echo suppressor 134 may apply different suppressions to different bands. If the echo suppressor 134 detects echo in particular bands, the echo suppressor 134 applies suppression to those particular bands. The echo suppressor 134 typically may apply up to between 20 and 25 dB of attenuation to the captured audio signal 126.

The double talk detector 401 generally generates a control signal 410 for controlling the echo canceller 132 and the echo suppressor 134. Double talk generally refers to the microphone 108 capturing audio (at the near end) concurrently with the loudspeaker 106 outputting audio (received from the far end). When there is no double talk, the captured audio signal 126 includes only echo of the far end speech output by the loudspeaker 106, and the control signal 410 controls the echo management system 130 to perform attenuation to reduce the amount of echo in the captured audio signal 122 transmitted to the far end. When there is double talk, the captured audio signal 126 includes both the echo of the far end and near end speech captured by the microphone 108, and the control signal 410 controls the echo suppressor 134 to perform little (or no) attenuation when generating the captured audio signal 122 transmitted to the far end; the control signal 410 may also control the echo canceller 132 to stop the adaptive filter from updating, in order to reduce mis-adaptation due to double talk. Additional details of the double talk detector 401 are provided below with reference to FIG. 4.

The audio codec system 201 generally performs analog-to-digital and digital-to-analog conversion on the signals it receives. The audio codec system 201 also performs up-sampling and down-sampling, as further detailed below with reference to FIG. 2. The audio codec system 201 receives the playback audio signal 124, performs digital-to-analog conversion, and generates a playback audio signal 140. The audio codec system 201 receives a captured audio signal 142, performs analog-to-digital conversion, and generates the captured audio signal 126. The audio codec system 201 provides the playback audio signal 140 to the loudspeaker 106, and receives the captured audio signal 142 from the microphone 108. Additional details of the audio codec system 201 are provided below with reference to FIG. 2.

The loudspeaker 106 generally outputs sound corresponding to the playback audio signal 140.

The microphone 108 generally captures sound in the environment where the device that implements the audio processing system 100 is present, and generates the captured audio signal 142. The captured sound not only includes the desired sound (e.g., the speech of persons speaking in the near end environment), but also sound output from the loudspeaker 106, which is referred to as "echo". One goal of the echo management system 130 is generally to reduce (or attenuate or remove) the echo from the captured audio signal 142, in appropriate circumstances.

The echo management system 130 is generally operable in three situations, based on the combinations of either or both of far end speech and near end speech being present. (The term "speech" is used because speech is generally the signal of interest; however, the signals captured at the near end and the far end will generally include both speech and other non-speech audio such as music, environmental noise, etc., with the term "speech" not meant to exclude non-speech audio.) When there is far end speech output by the loudspeaker 106 and no near end speech, the microphone 108 captures only the echo of the far end speech, so the echo management system 130 performs echo management to cancel the far end speech from the captured audio signal 126 when generating the captured audio signal 122 (e.g., a large amount of attenuation). When there is both far end speech output by the loudspeaker 106 and near end speech, the microphone 108 captures both the echo of the far end speech and the near end speech ("double talk"), so the echo management system 130 operates in accordance with the control signal 410. When there is no far end speech, the microphone 108 captures only near end speech, so the echo management system 130 performs minimal (or no) attenuation. In this manner, the control signal 410 helps the echo management system 130 to differentiate between the three situations.

In summary, the echo management system 130 generally operates to cancel the far end speech from the captured audio signal 126, leaving the near end speech when generating the captured audio signal 122. The double talk detector 401 generally controls the echo management system 130 to avoid applying aggressive attenuation when there is near end speech and no far end speech. For example, in an ideal situation the echo suppressor 134 performs minimal (or no) attenuation when there is near end speech.

The amount of echo present in the captured audio signal 142 may vary depending upon the physical attributes of the device that implements the audio processing system 100. For example, for a laptop device, the physical separation between the loudspeaker and the microphone 108 may only provide approximately 10 dB of signal attenuation. In telecommunications systems, the user experience generally prefers between 45 and 55 dB of echo cancellation and echo suppression, so the echo management system 130 generally operates to provide the other 35 to 45 dB of echo cancellation and echo suppression.

Figures 2, 4:
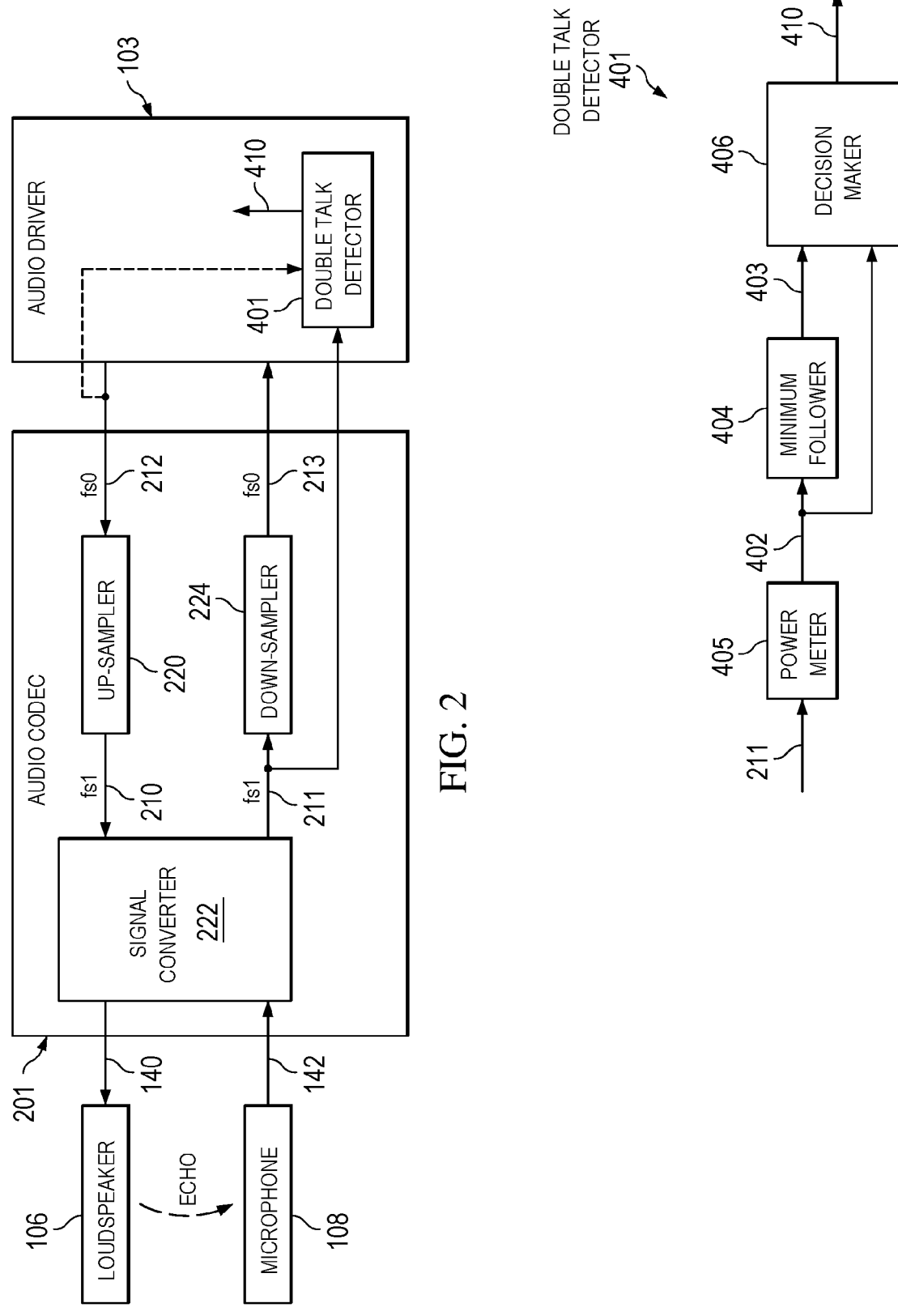
FIG. 2 is a block diagram showing additional details of the audio codec system 201 (see FIG. 1).
FIG. 4 is a block diagram showing additional details of the double talk detector 401 (see also FIGS. 1-2).

FIG. 2 is a block diagram showing additional details of the audio codec system 201 (see FIG. 1). The audio codec system 201 includes an up-sampler 220, a signal converter 222, and a down-sampler 224. Other components shown in FIG. 2 are similar to those described above with reference to FIG. 1 (e.g., the audio driver system 103, the loudspeaker 106, the microphone 108, the double talk detector 401, etc.) that have similar reference numerals. The audio codec system 201 may include additional components that (for brevity) are not discussed in detail.

The up-sampler 220 receives a playback audio signal 212, performs up-sampling, and generates an up-sampled signal 210. The playback audio signal 212 generally corresponds to the playback audio signal 124 provided by the audio driver system 103 (see FIG. 1). Up-sampling generally refers to converting a signal at a given sampling frequency to a higher sampling frequency. For example, the playback audio signal 212 may have a sampling frequency of 8 kHz (e.g., for a telephone connection), 16 kHz (e.g., a Microsoft Teams™ audio signal), 24 kHz (e.g., a Zoom™ audio signal), etc.; and the up-sampled signal 210 may have a sampling frequency of 16 kHz (e.g., 2× the 8 kHz signal, etc.), 32 kHz (e.g., 4× the 8 kHz signal, 2× the 16 kHz signal, 1.333× the 24 kHz signal, etc.), 48 kHz (6× the 8 kHz signal, 4× the 16 kHz signal, 2× the 24 kHz signal, etc.), etc. The lower sampling frequency may be referred to as fs0, and the higher sampling frequency may be referred to as fs1.

The signal converter 222 generally performs analog-to-digital and digital-to-analog conversion on signals. The signal converter 222 receives the up-sampled signal 210, performs digital-to-analog conversion, and generates the playback audio signal 140 for output by the loudspeaker 106. The signal converter 222 receives the captured audio signal 142 captured by the microphone 108, performs analog-to-digital conversion, and generates a captured audio signal 211. The signal converter 222 generally performs conversion at the higher sampling frequency (e.g. 48 kHz, corresponding to fs1 that is higher than the lower sampling frequency fs0 of the playback audio signal 212), so the captured audio signal 211 also has the higher sampling frequency (e.g. 48 kHz).

The down-sampler 224 receives the captured audio signal 211, performs down-sampling, and generates a down-sampled signal 213. The down-sampled signal 213 generally corresponds to the captured audio signal 126 provided to the audio driver system 103 (see FIG. 1). Down-sampling generally refers to converting a signal at a given sampling frequency to a lower sampling frequency. For example, the captured audio signal 211 may have a sampling frequency of 8 kHz (e.g., for a telephone connection), 16 kHz (e.g., a Microsoft Teams™ audio signal), 24 kHz (e.g., a Zoom™ audio signal), etc. In general, the down-sampled signal 213 and the playback audio signal 212 will have the same sampling frequency.

The double talk detector 401 receives the captured audio signal 211 from the audio codec system 201. Consequently, the captured audio signal 126 of FIG. 1 corresponds to both the captured audio signal 211 and the down-sampled signal 213.

Optionally, the double talk detector 401 may also receive the playback audio signal 212 that the audio driver system 103 provides to the audio codec system 201. This optional arrangement is discussed in more detail below with reference to FIG. 5.

Because the up-sampled signal 210 that is provided to the loudspeaker 106 for output results from up-sampling the playback audio signal 212, the echo of the up-sampled signal 210 captured by the microphone 108 will lack signal energy at frequencies above half of the sampling frequency of the playback audio signal 212, as further detailed with reference to FIGS. 3A-3B.

Figure 3A:
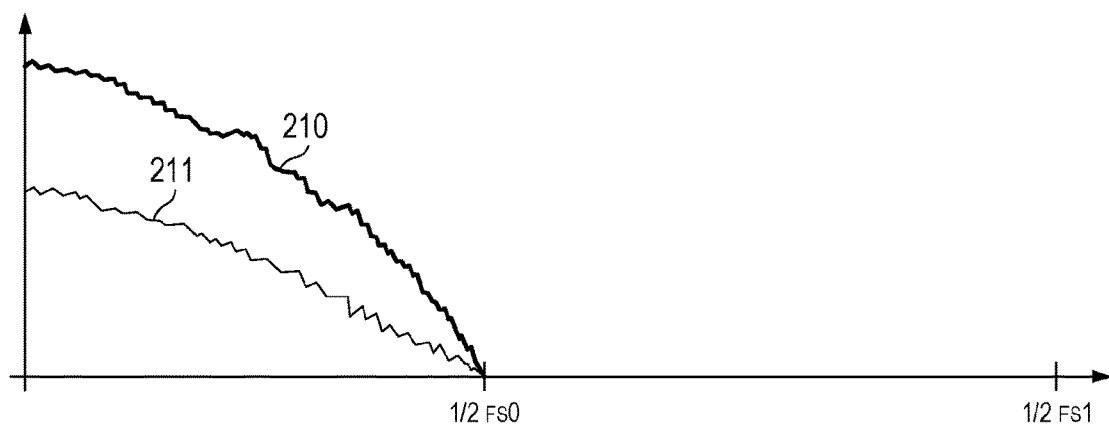
FIGS. 3A-3B are graphs showing the power spectrum of the up-sampled signal 210 and the captured audio signal 211 in two situations.
Figure 3B:
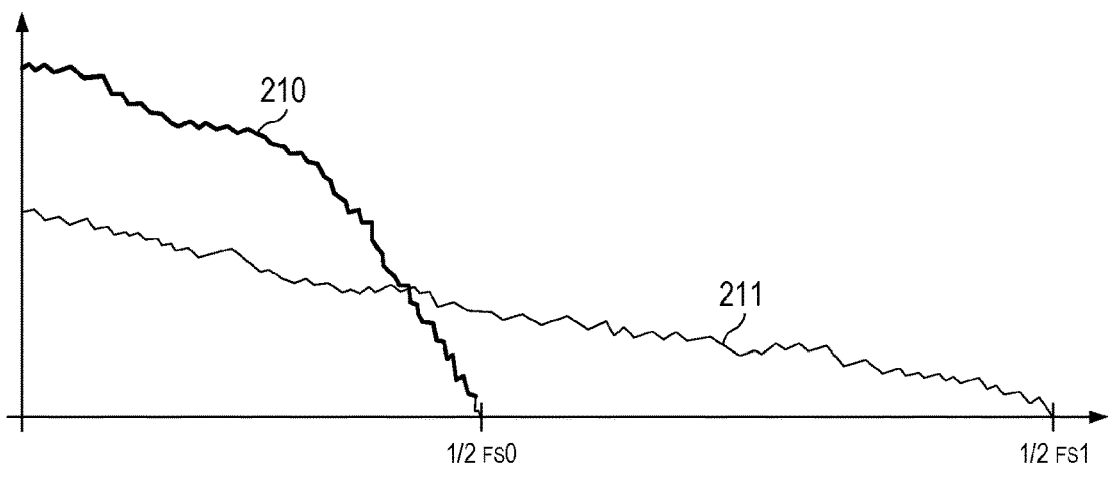

FIGS. 3A-3B are graphs showing the power spectrum of the up-sampled signal 210 and the captured audio signal 211 in two situations. FIG. 3A shows the power spectrum when the microphone 108 captures only far-end speech that has been output by the loudspeaker 106 (see FIGS. 1-2) without any captured near-end speech. FIG. 3B shows the power spectrum when the microphone 108 captures both far-end speech that has been output by the loudspeaker 106 (see FIGS. 1-2) and near-end speech. These two situations illustrate that when the microphone 108 has captured a signal, the audio processing system 100 needs to determine whether double talk exists (in which case it needs to apply little or no attenuation) or whether double talk does not exist (in which case it needs to apply a relatively large amount of attenuation due to the echo of the far end signal).

In FIG. 3A, the y-axis is signal power and the x-axis is frequency. The frequencies shown are ½ fs0 and ½ fs1 because as per the Nyquist-Shannon sampling theorem, a given sample rate S allows accurate reconstruction of a signal with a maximum frequency present in the signal of ½ S. For example, fs0 may be 24 kHz and fs1 may be 48 kHz, in which case ½ fs0 is 12 kHz and ½ fs1 is 24 kHz. When the microphone 108 captures only far-end speech that has been output by the loudspeaker 106 without any captured near-end speech, the up-sampled signal 210 and the captured audio signal 211 both have signal power only below ½ fs0. This is because the playback audio signal 212 has a sampling frequency of fs0 and thus has no signal energy above ½ fs0, so performing up-sampling likewise results in the up-sampled signal 210 also having no signal energy above ½ fs0. Thus, in the situation of FIG. 3A, the absence of signal power above ½ fs0 indicates the absence of double talk.

In FIG. 3B, when the microphone 108 captures both far-end speech that has been output by the loudspeaker 106 (see FIGS. 1-2) and near-end speech, the up-sampled signal 210 has signal power only below ½ fs0, but the captured audio signal 211 has signal power above ½ fs0 (both below ½ fs0 and between ½ fs0 and ½ fs1). This is because the captured audio signal 211 has a sampling frequency of fs1 and thus the near-end speech has energy that is captured up to ½ fs1, but the playback audio signal 212 still has no signal energy above ½ fs0. Thus, in the situation of FIG. 3B, the presence of signal power above ½ fs0 (e.g., between ½ fs0 and ½ fs1) indicates the presence of double talk.

FIG. 4 is a block diagram showing additional details of the double talk detector 401 (see also FIGS. 1-2). The double talk detector 401 includes a power meter 405, a minimum follower 404, and a decision maker 406. The double talk detector 401 may include other components that (for brevity) are not discussed in detail.

The power meter 405 generally receives the captured audio signal 211 (see FIG. 2), measures the power between ½ fs0 and ½ fs1, and generates a power signal 402. The power signal 402 generally corresponds to the root mean square (rms) power in the band between ½ fs0 and ½ fs1;

it may also be referred to as the instant power or the smoothed power of the captured audio signal 211.

The minimum follower 404 generally receives the power signal 402, tracks the background noise power, and generates a background noise power signal 403. The background noise power signal 403 generally corresponds to the background noise power between ½ fs0 and ½ fs1 of the power signal 402.

The decision maker 406 generally receives the power signal 402 and the background noise power signal 403, compares their levels, and generates the control signal 410. The decision maker 406 may operate according to a hysteresis decision process, e.g., to filter the inputs so that the output reacts less rapidly than it otherwise would by taking recent system history into account. When there is no double talk and the level of the power signal 402 exceeds the level of the background noise power signal 403 by a first threshold amount, the decision maker 406 fires. When there is double talk (that is, the decision maker 406 is in the fire state), the decision maker 406 changes to the off state only when the power signal 402 falls below a second threshold amount.

Figure 5:
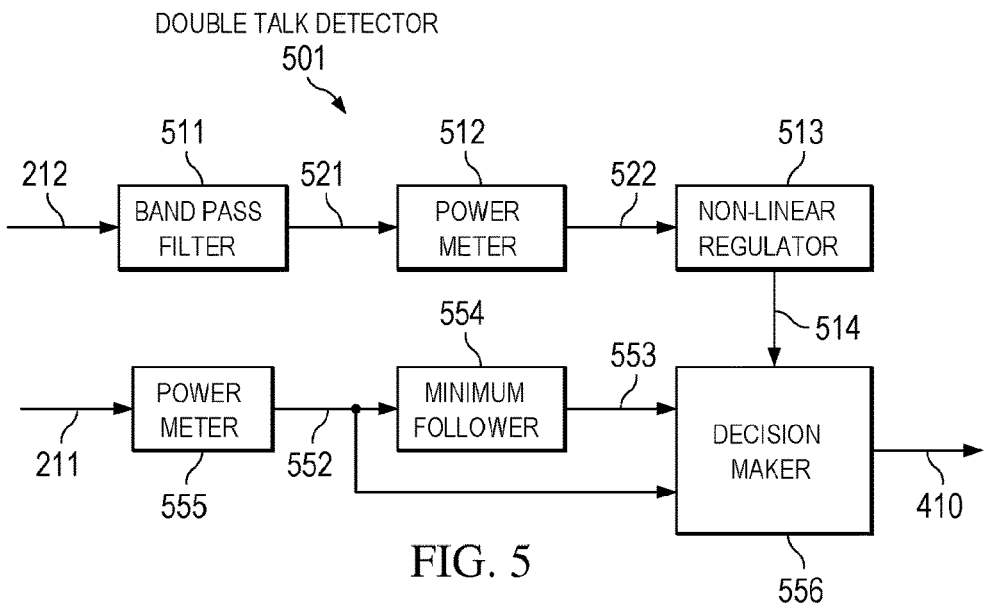
FIG. 5 is a block diagram of a double talk detector 501.

FIG. 5 is a block diagram of a double talk detector 501. The double talk detector 501 is similar to the double talk detector 401 (see FIG. 4), with additional components, and that also receives the playback audio signal 212 (see FIG. 2). Devices such as laptops and mobile telephones often implement the loudspeaker 106 (see FIG. 1) using micro-speakers. For micro-speakers, the transducer components and general mechanical distortions of the device may create additional power in the frequency range of [½ fs0, ½ fs1]. The double talk detector 501 may be used in such a case to reduce the false alarm rate (e.g., a false alarm due to detecting that near end voice is captured when in actuality there is no near end voice).

The double talk detector 501 includes a band pass filter 511, a power meter 512, and a non-linear regulator 513. The double talk detector 501 also includes a power meter 555, a minimum follower 554, and a decision maker 556 (which are similar to the power meter 405, the minimum follower 404 and the decision maker 406 of FIG. 4).

The power meter 555 generally receives the captured audio signal 211 (see FIG. 2) and generates a power signal 552, in a manner similar to that of the power meter 405. The minimum follower 554 generally receives the power signal 552 and generates a background noise power signal 553, in a manner similar to that of the minimum follower 404.

The band pass filter 511 generally receives the playback audio signal 212, performs band pass filtering, and generates a filtered signal 521. The pass band of the band pass filter 511 may be a band B around a resonant frequency $f_{res}$. The resonant frequency $f_{res}$ generally corresponds to the specific components used to implement the loudspeaker 106 and the other components of the device implementing the audio processing system 100, and may be measured empirically. The band B may also be determined empirically based on the other components of the device implementing the audio processing system 100. An example range of the band B is 600 Hz, resulting in the band pass filter 511 having a pass band of [$f_{res}$— 300, $f_{res}$+300].

The power meter 512 generally receives the filtered signal 521, measures the signal power, and generates a resonant power signal 522. The resonant power signal ($P_{res}$) 522 corresponds to the signal power of the filtered signal 521 (e.g., the power of the mechanical resonance of the loudspeaker 106).

The non-linear regulator 513 generally receives the resonant power signal 522, performs non-linear regulation, and generates a distortion power signal ($P_{dist}$) 514. The distortion power signal 514 corresponds to the distortion power in the frequency range [½ fs0, ½ fs1]. The non-linear regulator 513 may perform non-linear regulation to generate the distortion power signal $P_{dist}$ as follows:

$$P_{dist} = \begin{cases} 0 & \text{if } P_{res} < th0 \\ k \cdot (P_{res} - th0) & \text{if } P_{res} \geq th0 \end{cases}$$

In the above equation, th0 is a threshold parameter, and k is a tuning parameter; these parameters may be adjusted as desired according to empirical measurements. The regulation is referred to as non-linear due to the two functions of $P_{dist}$ that depend upon the relation between $P_{res}$ and th0. The slope of $P_{dist}$ is controlled by the tuning parameter k applied to the difference between $P_{res}$ and th0, and the starting point where $P_{dist}$ starts increasing from zero is controlled by the relation between $P_{res}$ and th0.

The decision maker 556 generally receives the power signal 552, the background noise power signal 553 and the distortion power signal 514, compares their levels, and generates the control signal 410. In general, the decision maker 556 uses the distortion power signal 514 as part of determining whether the energy is mainly from the captured near end voice or from device distortions. More specifically, the decision maker 556 uses the distortion power signal 514 to increase the threshold of the hysteresis applied to the power signal 552 and the background noise power signal 553 (e.g., the first threshold discussed above regarding the decision maker 406). The decision maker 556 is otherwise similar to the decision maker 406.

FIG. 6 is a mobile device architecture 600 for implementing the features and processes described herein, according to an embodiment. The architecture 600 may be implemented in any electronic device, including but not limited to: a desktop computer, consumer audio/visual (AV) equipment, radio broadcast equipment, mobile devices (e.g., smartphone, tablet computer, laptop computer, wearable device), etc. In the example embodiment shown, the architecture 600 is for a laptop computer and includes processor(s) 601, peripherals interface 602, audio subsystem 603, loudspeakers 604, microphone 605, sensors 606 (e.g., accelerometers, gyros, barometer, magnetometer, camera), location processor 607 (e.g., GNSS receiver), wireless communications subsystems 608 (e.g., Wi-Fi, Bluetooth, cellular) and I/O subsystem(s) 609, which includes touch controller 610 and other input controllers 611, touch surface 612 and other input/control devices 613. Other architectures with more or fewer components can also be used to implement the disclosed embodiments.

Memory interface 614 is coupled to processors 601, peripherals interface 602 and memory 615 (e.g., flash, RAM, ROM). Memory 615 stores computer program instructions and data, including but not limited to: operating system instructions 616, communication instructions 617, GUI instructions 618, sensor processing instructions 619, phone instructions 620, electronic messaging instructions 621, web browsing instructions 622, audio processing instructions 623, GNSS/navigation instructions 624 and applications/data 625. Audio processing instructions 623 include instructions for performing the audio processing described herein.

Figure 7:
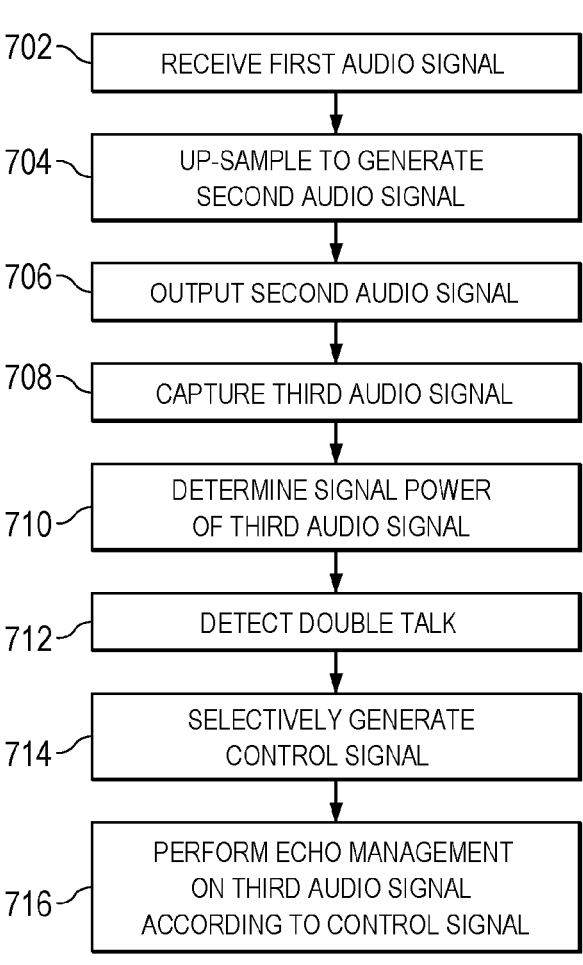
FIG. 7 is a flowchart of a method 700 of audio processing.

FIG. 7 is a flowchart of a method 700 of audio processing. The method 700 may be performed by a device (e.g., a laptop computer, a mobile telephone, etc.) with the components of the architecture 600 of FIG. 6, to implement the functionality of the audio processing system 100 (see FIG. 1), the audio codec system 201 (see FIG. 2), the double talk detector 401 (see FIG. 4), the double talk detector 501 (see FIG. 5), etc., for example by executing one or more computer programs.

At 702, a first audio signal is received. The first audio signal has a first sampling frequency. For example, the audio codec system 201 (see FIG. 2) may receive the playback audio signal 212 that has the sampling frequency fs0.

At 704, the first audio signal is up-sampled to generate a second audio signal. The second audio signal has a second sampling frequency that is greater than the first sampling frequency. For example, the up-sampler 220 (see FIG. 2) may up-sample the playback audio signal 212 to generate the up-sampled signal 210 having the sampling frequency fs1. As a specific example, fs0 may be 24 kHz and fs1 may be 48 kHz.

At 706, a loudspeaker output corresponding to the second audio signal may be outputted by a loudspeaker. For example, the loudspeaker 106 (see FIG. 2) may output an audio output corresponding to the up-sampled signal 210.

At 708, a third audio signal is captured by a microphone. The third audio signal has a third sampling frequency that is greater than the first sampling frequency. The third sampling frequency may be the same as the second sampling frequency. For example, the microphone 108 (see FIG. 2) may capture the captured audio signal 211 having the sampling frequency fs1. The captured audio signal 211 may include echo (e.g., of the loudspeaker output corresponding to the second audio signal), captured near end speech (e.g., local talk), mechanical distortion of the device that is performing the method 700 (e.g., other local audio), etc.

At 710, a signal power of the third audio signal is determined. For example, the double talk detector 401 (see FIG. 4) may determine the signal power of the captured audio signal 211. As another example, the double talk detector 501 (see FIG. 5) may determine the signal power of the captured audio signal 211.

At 712, double talk is detected when there is signal power of the third audio signal determined in a frequency band greater than the first sampling frequency. For example, the double talk detector 401 may detect double talk based on the signal power in the frequency band [½ fs0, ½ fs1]; when there is no signal power (e.g., as shown in FIG. 3A), no double talk is detected, and when there is signal power (e.g., as shown in FIG. 3B), double talk is detected.

At 714, a control signal is selectively generated when the double talk is detected. For example, the double talk detector 401 (see FIG. 4) may generate the control signal 410 when double talk is detected. As another example, the double talk detector 501 (see FIG. 5) may generate the control signal 410 when double talk is detected.

At 716, echo management is performed on the third audio signal according to the control signal. For example, the echo management system 130 (see FIG. 1) may perform echo cancellation, echo suppression, etc. on the captured audio signal 126, based on the control signal 410, to generate the captured audio signal 122.

The method 700 may include additional steps corresponding to the other functionalities of the audio processing system 100 described herein.

Additional Applications

As discussed above, the audio processing system 100 is able to detect double talk as part of the echo management process. In addition, the audio processing system 100 is able to detect other audio distortions, for example due to moving the device, or otherwise when the device is subjected to tactile interactions. In such a case, the echo management system 130 may adapt the echo canceller 132 to perform echo cancellation, even in the absence of near end speech or captured far end speech.

Implementation Details

An embodiment may be implemented in hardware, executable modules stored on a computer readable medium, or a combination of both (e.g., programmable logic arrays). Unless otherwise specified, the steps executed by embodiments need not inherently be related to any particular computer or other apparatus, although they may be in certain embodiments. In particular, various general-purpose machines may be used with programs written in accordance with the teachings herein, or it may be more convenient to construct more specialized apparatus (e.g., integrated circuits) to perform the required method steps. Thus, embodiments may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein. (Software per se and intangible or transitory signals are excluded to the extent that they are unpatentable subject matter.)

Aspects of the systems described herein may be implemented in an appropriate computer-based sound processing network environment for processing digital or digitized audio files. Portions of the adaptive audio system may include one or more networks that comprise any desired number of individual machines, including one or more routers (not shown) that serve to buffer and route the data transmitted among the computers. Such a network may be built on various different network protocols, and may be the Internet, a Wide Area Network (WAN), a Local Area Network (LAN), or any combination thereof.

One or more of the components, blocks, processes or other functional components may be implemented through a computer program that controls execution of a processor-based computing device of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A computer-implemented method of audio processing, the method comprising:

receiving a first audio signal, wherein the first audio signal has a first sampling frequency;

up-sampling the first audio signal to generate a second audio signal, wherein the second audio signal has a second sampling frequency that is greater than the first sampling frequency;

outputting, by a loudspeaker, a loudspeaker output corresponding to the second audio signal;

capturing, by a microphone, a third audio signal, wherein the third audio signal is sampled at the second sampling frequency;

determining a signal power of the third audio signal; and detecting double talk when there is signal power of the third audio signal determined in a frequency band having frequencies all greater than half the first sampling frequency.

2. The method of claim 1, further comprising:

selectively generating a control signal when the double talk is detected; and performing echo management on the third audio signal according to the control signal.

3. The method of claim 2, wherein performing echo management includes:

performing echo cancellation on the third audio signal according to the control signal, wherein the echo cancellation performs a linear attenuation on the third audio signal.

4. The method of claim 2, wherein performing echo management includes:

performing echo suppression on the third audio signal according to the control signal, wherein the echo suppression performs a non-linear attenuation on particular frequency bands of the third audio signal.

5. The method of claim 1, wherein the third audio signal includes local audio and the loudspeaker output, wherein the local audio corresponds to audio other than the loudspeaker output, and wherein the local audio is not outputted by the loudspeaker and is captured by the microphone.

6. The method of claim 1, wherein the first sampling frequency is 8 kHz, and wherein the second sampling frequency is at least 16 kHz.

7. The method of claim 1, further comprising:

down-sampling the third audio signal to generate a fourth audio signal, wherein the fourth audio signal has a third sampling frequency that is less than the second sampling frequency; and transmitting the fourth audio signal to a far end device.

8. The method of claim 7, wherein the third sampling frequency and the first sampling frequency are the same sampling frequency.

9. The method of claim 1, wherein determining the signal power of the third audio signal and detecting the double talk includes:

measuring the signal power of the third audio signal in the frequency band greater than the first sampling frequency;

tracking a background noise power of the third audio signal in the frequency band greater than the first sampling frequency; and detecting the double talk as a result of comparing the signal power of the third audio signal in the frequency band having frequencies all greater than half the first sampling frequency and the background noise power of the third audio signal in the frequency band having frequencies all greater than half the first sampling frequency.

10. The method of claim 1, wherein determining the signal power of the third audio signal and detecting the double talk includes:

measuring the signal power of the third audio signal in the frequency band greater than the first sampling frequency;

tracking a background noise power of the third audio signal in the frequency band greater than the first sampling frequency;

measuring a distortion power of the first audio signal; and detecting the double talk based on the signal power of the third audio signal in the frequency band having frequencies all greater than half the first sampling frequency, the background noise power of the third audio signal in the frequency band having frequencies all greater than half the first sampling frequency, and the distortion power of the first audio signal.

11. The method of claim 10, wherein measuring the distortion power of the first audio signal includes:

generating a filtered signal by performing band pass filtering on the first audio signal;

measuring a signal power of the filtered signal; and determining the distortion power by performing non-linear regulation on the signal power of the filtered signal.

12. A non-transitory computer readable medium storing a computer program that, when executed by a processor, controls an apparatus to execute processing including the method of claim 1.

13. An apparatus for audio processing, the apparatus comprising:

a loudspeaker;

a microphone; and a processor;

wherein the processor is configured to control the apparatus to receive a first audio signal, wherein the first audio signal has a first sampling frequency;

wherein the processor is configured to control the apparatus to up-sample the first audio signal to generate a second audio signal, wherein the second audio signal has a second sampling frequency that is greater than the first sampling frequency;

wherein the processor is configured to control the apparatus to output, by the loudspeaker, a loudspeaker output corresponding to the second audio signal;

wherein the processor is configured to control the apparatus to capture, by the microphone, a third audio signal, wherein the third audio signal is sampled at the second sampling frequency;

wherein the processor is configured to control the apparatus to determine a signal power of the third audio signal; and wherein the processor is configured to control the apparatus to detect double talk when there is signal power of the third audio signal determined in a frequency band having frequencies all greater than half the first sampling frequency.

14. The apparatus of claim 13, wherein the processor is configured to control the apparatus to selectively generate a control signal when the double talk is detected; and wherein the processor is configured to control the apparatus to perform echo management on the third audio signal according to the control signal.

15. The apparatus of claim 14, wherein controlling the apparatus to perform echo management includes:

controlling the apparatus to perform echo cancellation on the third audio signal according to the control signal, wherein the echo cancellation performs a linear attenuation on the third audio signal.

16. The apparatus of claim 14, wherein controlling the apparatus to perform echo management includes:

controlling the apparatus to perform echo suppression on the third audio signal according to the control signal, wherein the echo suppression performs a non-linear attenuation on particular frequency bands of the third audio signal.

17. The apparatus of claim 13, wherein the processor is configured to control the apparatus to down-sample the third audio signal to generate a fourth audio signal, wherein the fourth audio signal has a third sampling frequency that is less than the second sampling frequency; and wherein the processor is configured to control the apparatus to transmit the fourth audio signal to a far end device.

18. The apparatus of claim 13, wherein controlling the apparatus to determine the signal power of the third audio signal and to detect the double talk includes:

controlling the apparatus to measure the signal power of the third audio signal in the frequency band greater than the first sampling frequency;

controlling the apparatus to track a background noise power of the third audio signal in the frequency band greater than the first sampling frequency; and controlling the apparatus to detect the double talk as a result of comparing the signal power of the third audio signal in the frequency band having frequencies all greater than half the first sampling frequency and the background noise power of the third audio signal in the frequency band having frequencies all greater than half the first sampling frequency.

19. The apparatus of claim 13, wherein controlling the apparatus to determine the signal power of the third audio signal and to detect the double talk includes:

controlling the apparatus to measure the signal power of the third audio signal in the frequency band greater than the first sampling frequency;

controlling the apparatus to track a background noise power of the third audio signal in the frequency band greater than the first sampling frequency;

controlling the apparatus to measure a distortion power of the first audio signal; and controlling the apparatus to detect the double talk based on the signal power of the third audio signal in the frequency band having frequencies all greater than the half first sampling frequency, the background noise power of the third audio signal in the frequency band having frequencies all greater than half the first sampling frequency, and the distortion power of the first audio signal.

20. The apparatus of claim 19, wherein controlling the apparatus to measure the distortion power of the first audio signal includes:

controlling the apparatus to generate a filtered signal by performing band pass filtering on the first audio signal; 5 controlling the apparatus to measure a signal power of the filtered signal; and controlling the apparatus to determine the distortion power by performing non-linear regulation on the signal power of the filtered signal. 10

\* \* \* \* \*